US005705266A

United States Patent [19]

Keelan et al.

[11] Patent Number: 5,705,266

[45] **Date of Patent: *Jan. 6, 1998**

[54] CORE MATERIAL FOR THE CASTING OF ARTICLES AND RELATED PROCESS

[75] Inventors: Thomas Michael Keelan, Howell; Stanley Joseph Hinkle, Milford, both of Mich.

[73] Assignee: Detroit Diesel Corporation, Detroit, Mich.

[*] Notice: The term of this patent shall not extend beyond the expiration date of Pat. No. 5,239,956.

[21] Appl. No.: 320,933

[22] Filed: Oct. 11, 1994

Related U.S. Application Data

[62] Division of Ser. No. 13,817, Feb. 2, 1993, Pat. No. 5,354,608, which is a division of Ser. No. 711,917, Jun. 7, 1991, Pat. No. 5,239,956.

[51] Int. Cl.$^6$ .......... B32B 5/16; B22D 19/00; B22C 9/00

[52] U.S. Cl. .......... 428/313.3; 428/313.7; 428/325; 428/402; 428/404; 427/134; 164/9; 164/33; 164/349

[58] Field of Search .......... 428/325, 327, 428/332, 338, 339, 402, 404, 407, 313.3, 313.5, 313.7; 164/349, 365, 366, 367, 9, 11, 33; 427/134

[56] References Cited

U.S. PATENT DOCUMENTS

| | | | |
|---|---|---|---|
| 2,806,509 | 9/1957 | Bozzacco et al. . | |
| 3,786,795 | 1/1974 | Kaneko et al. . | |
| 3,919,755 | 11/1975 | Kaneko et al. | 29/888.061 |
| 3,942,581 | 3/1976 | Sawyer | 164/60 |
| 3,949,552 | 4/1976 | Kaneko et al. | 60/282 |
| 4,167,207 | 9/1979 | Rao et al. | 164/9 |
| 4,186,222 | 1/1980 | Sellars et al. | 427/134 |
| 4,195,478 | 4/1980 | Rao et al. | 60/282 |
| 4,207,660 | 6/1980 | Rao et al. | 29/888.01 |
| 4,235,836 | 11/1980 | Wassell et al. | 264/333 |
| 4,289,803 | 9/1981 | Wales et al. | 427/134 |
| 4,340,108 | 7/1982 | Chandley et al. | 164/63 |
| 4,346,556 | 8/1982 | Rice et al. | 60/272 |
| 4,375,233 | 3/1983 | Rossmann et al. | 164/9 |
| 4,416,621 | 11/1983 | Huther | 431/352 |
| 4,523,554 | 6/1985 | Ryu | 123/193.2 |
| 4,531,502 | 7/1985 | Misuhara | 123/668 |

(List continued on next page.)

FOREIGN PATENT DOCUMENTS

| | | |
|---|---|---|
| 2431335 | 2/1980 | France . |
| 3123134 | 12/1982 | Germany . |
| 59-76656 | 5/1984 | Japan . |
| 59-078679 | 7/1984 | Japan . |
| 63-86876 | 4/1985 | Japan . |
| 60-203355 | 10/1985 | Japan . |
| 62-211138 | 9/1987 | Japan . |
| 62-21138-A | 9/1987 | Japan . |
| 1435374 | 11/1988 | U.S.S.R. . |
| 8303212 | 9/1983 | WIPO . |

*Primary Examiner*—Marie Yamnitzky
*Attorney, Agent, or Firm*—Brooks & Kushman P.C.

[57] ABSTRACT

A core material for making cores to be used in molds for the casting of metals and comprising a mixture of hollow ceramic particles uniformly distributed throughout a resin binder of organic material. The hollow ceramic particles are individually in intimate surface contact with adjacent individual hollow ceramic particles throughout the core materials to allow the heat of the casting to be conducted efficiently through the core material. The amount of resin binder being maintained at a minimum to reduce the amount of gas generated by the resin binder as it is exposed to the heat of the metal being cast. The hollow ceramic particles comprising about 99.0 to about 96.5% by weight of the core material and the resin binder comprising about 1.0 to 3.5% by weight, respectively, of the core material prior to the core material being cured, and the hollow ceramic particles preferably ranging in diameter from about 200 microns to about 450 microns, with a preferred mean diameter of about 325 microns.

8 Claims, 5 Drawing Sheets

U.S. PATENT DOCUMENTS 4,604,779 8/1986 Narita et al. .................... 29/888.061
4,623,584 11/1986 Masui et al. .................... 428/304.4
4,739,738 4/1988 Sander et al. .................... 123/193.6
4,796,572 1/1989 Heydrich .................... 123/41.42
4,873,114 10/1989 Harris .................... 427/27
4,884,400 12/1989 Tanaka et al. .................... 60/323
4,909,230 3/1990 Kawamura .................... 123/668
4,972,674 11/1990 Yamada et al. .................... 60/323
5,033,427 7/1991 Kawamura et al. .................... 123/193.3
5,098,781 3/1992 Minnick et al. .................... 428/313.5
5,143,777 9/1992 Mills .................... 428/212
5,150,572 9/1992 Johnson et al. .................... 60/272
5,223,213 6/1993 Kamimura et al. .................... 419/35
5,273,104 12/1993 Renaud et al. .................... 164/529

Fig-4
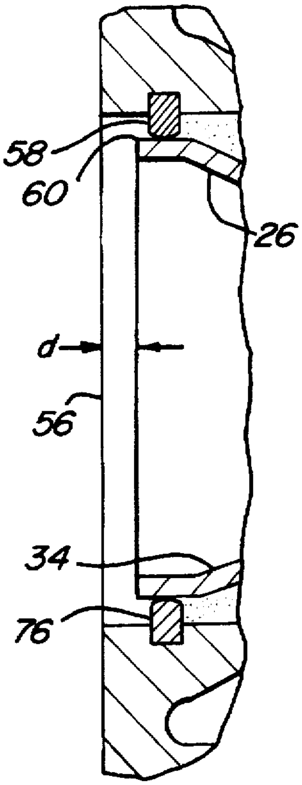
Fig-6
PRIOR ART
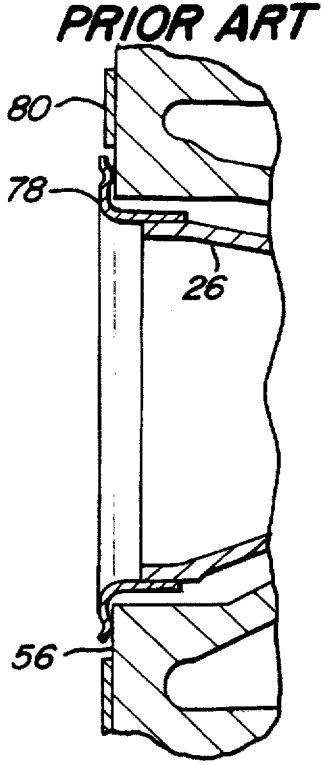
Fig-7
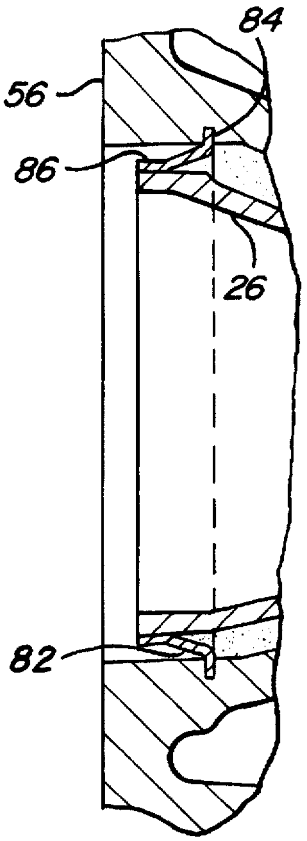
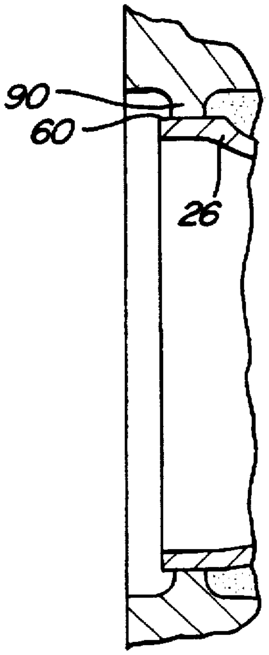
Fig-8
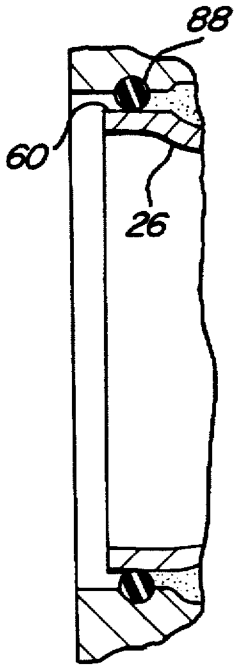
Fig-9
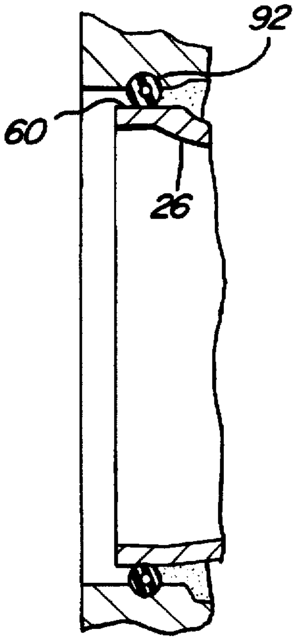
Fig-10

CORE MATERIAL FOR THE CASTING OF ARTICLES AND RELATED PROCESS

This is a divisional of application Ser. No. 08/013,817 filed on 02 Feb. 1993, (now U.S. Pat. No. 5,354,608), which is a divisional of Ser. No. 07/711,917, now U.S. Pat. No. 5,239,956, filed Jun. 7, 1991, and issued on Aug. 31, 1993.

TECHNICAL FIELD

This invention relates to cylinder heads for internal combustion engines and their method of manufacture. More specifically, it relates to cylinder heads designed for use with two and four cycle diesel engine applications and other engine applications where a premium is placed on limiting the amount of heat transferred from the exhaust gas to the cylinder head and maximizing the temperatures of the exhaust gases exiting the cylinder head.

The invention also relates to a method of manufacturing such a cylinder head or related article which includes casting in place a liner for moving the exhaust gases which is supported by, but insulated from, the cylinder head casting itself.

BACKGROUND ART

Low heat rejection cylinder heads offer numerous advantages in the performance of internal combustion engines, and particularly diesel engine exhaust and air systems. These advantages include reduced cooling system burdens as well as improved engine performance, reliability, durability and fuel economy. Much of the benefit obtained is a result of the synergistic effect one design feature has on the other. For example, the cylinder heads which port the high temperature exhaust gases from the combustion chamber to an exhaust manifold are generally water cooled. To the extent that the amount of heat from the exhaust gases can be reduced, the cooling requirements are likewise reduced which can lead to advantages of lower capacity, and lower cost, cooling systems.

Further, given that the heat transfer of the exhaust gases given up to the cylinder head can be reduced, the exhaust gases themselves will be hotter and the increased energy therein can be used to good effect in turbo-charging or otherwise preconditioning the engine intake air to be used for combustion.

Heretofore, the state of the art has been to incorporate cast-in-place stainless steel heat shields in the exhaust ports of the cylinder head. The heat shields provided thermal insulating air gaps between the hot exhaust gases exiting the combustion chamber and the surface of the cast cylinder head wall defining the exhaust port cavities containing the heat shields. The opposite side of this cast wall is in contact with coolant circulating through the cylinder head. By reducing heat loss from the hot gases in the exhaust ports, more heat energy is available in the exhaust gases, where it can be productively used by a turbocharger, for example.

In the aforementioned known construction, the exhaust shields served to create an air gap between the outer shield surface and the water cooled port wall of the cylinder head casting, thereby reducing the amount of heat transferred from the exhaust gas to the cylinder head and thereby to the cylinder head coolant. By reducing the amount of heat transferred to the coolant, the engine's cooling system burden (i.e., total engine heat rejected to the coolant) has been typically reduced by as much as 15–23%. Further benefits result from the fact that by shielding the exhaust gases from the cylinder head casting, more exhaust gas heat energy is retained for utilization in the turbo-charger which increases the overall thermal efficiency of the engine.

Using the cast-in-place method, the cast stainless steel exhaust shield is inserted into the cylinder head mold before the iron is poured. As the iron is poured, a thin layer of sand around the outside of the shield serves to maintain a space between the adjacent interior wall of the cylinder head and the shield. At certain areas of the shield, the iron actually fuses to the shield forming a diffusion bond. This bond results in a permanent jointure between the two pieces. When the casting is cooled, the sand is removed and the air gap remains, covering as much as 90% or more of the surface area of the exhaust gas exit passage through the cylinder head (exhaust port).

The cast-in-place method is superior to a shield that is inserted after the casting process in several ways. Space utilization is excellent since assembly clearances are not needed. Also, cylinder head machining is greatly reduced because the cylinder head to shield mating surfaces are integrally bonded at the desired interface junctures. This forms a completed assembly directly out of the mold.

The cylinder head's low heat rejection function centers around the stainless steel exhaust shield. The term "shield" is used herein because the part's function is to shield the cylinder head water jacket system from unwanted exhaust gas heat. This function requires a material of superior high temperature strength and corrosion resistance. Because the air gap reduces the heat transfer from the exhaust gases, the shield temperature will approach exhaust gas temperatures, which typically are at about or slightly in excess of 480° Centigrade (900° F.) in a two-stroke diesel engine. AISI 347 stainless steel is a known suitable material for this heat shield application.

The shield itself is a casting, being produced by a vacuum-assisted casting process allowing various materials to be cast with very thin walls, i.e., in the order of 0.178 centimeters (0.070 inches) and improved dimensional stability. Such a process is described in U.S. Pat. No. 4,340, 108.

The process for casting the shield in place is similar to normal gravity sand casting, with principal variations as described below. After the shield is cast, a machining operation finishes the end of the shield, i.e., that which connects to the exhaust manifold, for a tight, sliding, interengaging-type fit with a flange seal to be incorporated between the exhaust manifold gasket-cylinder head interface. A slip fit sealing arrangement of this type is generally shown in FIG. 6. Once machined, the shields may be plated to provide an enhanced diffusion bond with the cast iron. The shield is then placed into a core box. The cold box core operation locates the shield and blows the desired amount of sand around the shield to form the air gap and fill in the interior of the shield.

In engines where each combustion chamber has two or more exhaust ports, particularly where they are diametrically opposed from one another, it is not uncommon to use two shields and to make up a pair of exhaust port cores containing the shields as a single core, thereby forming the exhaust passage for one cylinder position in the cylinder head. At this point, a graphite-based refractory coating (core wash) is applied to the core to inhibit bonding at certain areas of the shields. Core washes are normally applied to the cores to facilitate sand release from the resultant iron surface.

Upon completing the casting of the cylinder head, the core sand is removed, thereby providing, among other things, an air gap between the heat shield and cylinder head interior. A flange seal may thereafter be mounted on the heat shield at the end nearest the exhaust gas outlet.

SUMMARY OF THE INVENTION

It is an object of the present invention to provide an internal combustion engine with the means of maintaining to a minimum the heat rejected from the exhaust gases to the engine itself.

It is another object of the invention to increase the efficiency in internal combustion engines by restricting the amount of heat rejected to the cylinder heads and thereby reducing the demand on the cooling system to carry away the excess heat, and at the same time, increasing the energy availability of the exhaust gases which can be recovered by various waste heat recovery techniques to derive additional engine output power.

It is a further object of the invention to provide an internal combustion engine with a cylinder head having a heat shield in the exhaust ports of high heat resistant material, higher than that of the cylinder head itself, and providing between the port heat shield and the cylinder an insulation blanket of extremely low thermal conductivity.

It is yet a further object of the present invention to provide the aforesaid heat shield as being cast in place during the casting of the cylinder head and thereby affixing the heat shield to the cylinder head by means of diffusion bonding during the casting of the cylinder head.

A still further object of the present invention is to provide the aforementioned heat shield and low heat conductivity insulating material surrounding the heat shield as a unitary mold core to be placed in the mold as a single unit as a preliminary step to the casting of the cylinder head.

Another object of the invention is to provide the aforesaid heat shield as a core with a seal means at one end of the heat shield in proximity to an exhaust manifold with a seal member adapted to be cast in place and held to the cylinder head casting as a diffusion bonded article at its outer diameter and with a tight slip-fit with the heat shield at its inner diameter to thereby allow sliding interengagement with the heat shield as the heat shield expands and contracts during the cycling of exhaust gases through the cylinder head.

It is yet still a further object of the invention to provide the aforementioned heat shield and seal member combination with the means to radially expand as the exhaust gases are cycled through the cylinder head.

More specifically, the invention contemplates a process for casting metal articles wherein a sand mold is used to define at least a portion of the shape of the article being cast and at least a portion of the sand mold comprises a constituent layer of hollow ceramic particles.

The invention further contemplates a core material for making cores to be used in molds for the casting of metals comprising hollow ceramic particles uniformly distributed throughout a resin binder material. The hollow ceramic particles are in contact with one another throughout the core material. The amount of resin binder is maintained at a minimum to reduce the amount of gas generated by the binder as it is exposed to the heat of the metal being cast.

The invention also contemplates a cast iron cylinder head for an internal combustion engine having a main body portion and a cast-in-place high strength steel exhaust heat shield having a pair of ends adapted to extend from a combustion chamber at one end thereof to an exhaust manifold at the other said end thereof. The exhaust heat shield is supported by the main body portion at the ends in spaced relationship relative to the main body portion throughout substantially the remainder of the exhaust port shield to provide a heat insulating chamber about the exhaust heat shield between the ends thereof. The heat insulating chamber is filled with a ceramic heat insulating material comprising hollow ceramic particles, and is sealed at both ends of the exhaust heat shield whereby the ceramic heat insulating material is contained within the cylinder head.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is an exploded view of the encircled portion marked "4" in FIG. 3 and showing the details of the exhaust heat shield and the seal in accordance with one embodiment of the present invention;

FIG. 6 is a view similar to FIG. 5 but showing an exhaust heat shield flange seal in accordance with the prior art;

FIGS. 7–10 are sectional views similar to FIGS. 5 and 6 and showing in each Figure an alternative embodiment of the exhaust heat shield seal in accordance with the present invention;

BEST MODE FOR CARRYING OUT THE INVENTION

Figure 1:
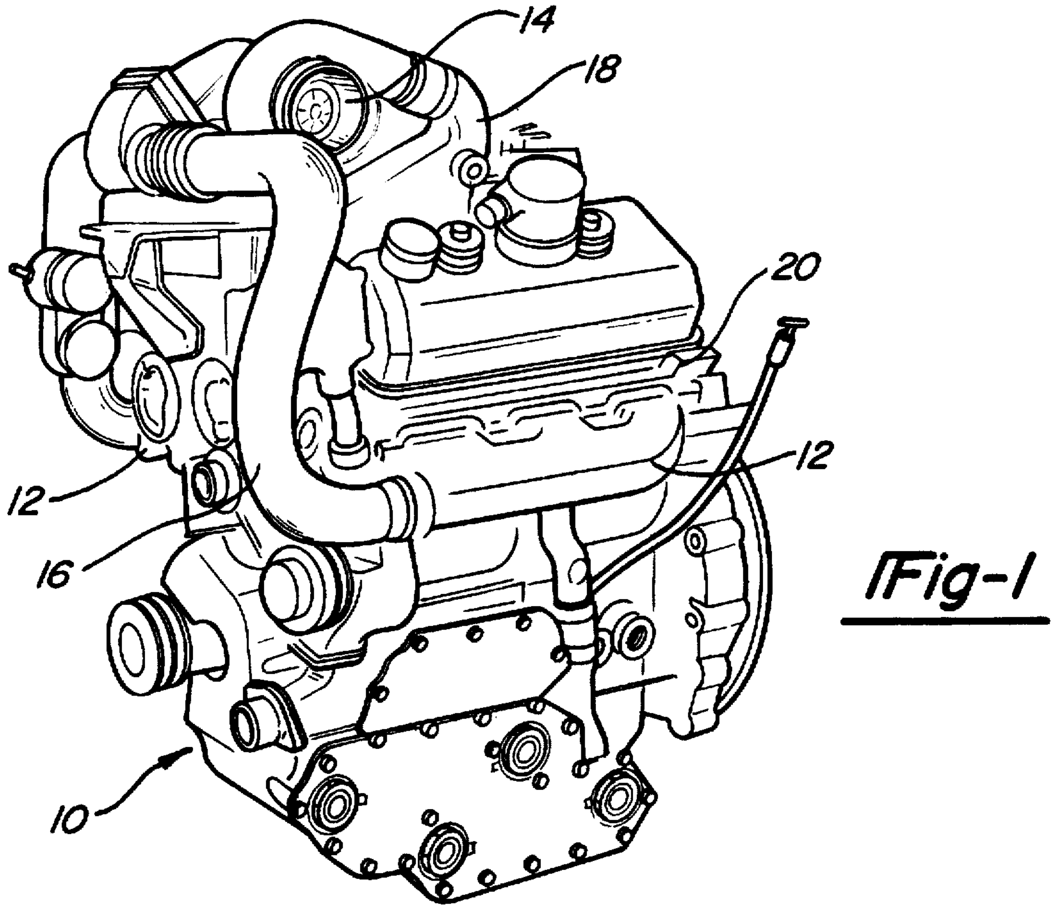
FIG. 1 is a general perspective view of an internal combustion engine which may be equipped with an improved cylinder head in accordance with the present invention.

The two cycle diesel engine shown in FIG. 1 is helpful in understanding the effect of the improved low heat rejection cylinder head construction and the overall performance of the engine and the synergistic effect it has in combination with the air/exhaust system forming a part of the engine. It will be noted that the engine, generally designated 10, is of the V-type and includes exhaust manifolds 12 on opposite sides of the engine. An intake plenum is located in the "V" of the engine block below a turbocharger 14. A Roots type positive displacement charging blower (not shown) is located over the "V" of the engine block. The turbocharger 14 receives exhaust gas from the exhaust manifold 12 via the exhaust pipe 16. The exhaust gas energy is used by the turbocharger to compress engine intake air which is delivered to the Roots blower from the turbocharger compressor outlet 18 at elevated pressures, and subsequently to the intake plenum. Availability of the higher heat content exhaust gases increases the overall thermal efficiency of the engine. Additionally, the incoming air system for providing air to the combustion chamber may be provided with a bypass blower (not shown, but located directly below the turbo-charger 14).

The engine is water-cooled. The water pump, fan and the radiator are not shown. However, it will be understood that the capacity or size of the cooling system will be dictated by the amount of energy which must be removed from the exhaust gases to keep the engine at acceptably low operating temperatures.

The aforementioned synergistic effect will be readily apparent. By retaining the temperature of the exhaust gases as they pass through the exhaust ports of the cylinder head, the heat energy may be utilized to advantage in the engine air system. At the same time decreasing the heat transfer from the exhaust gases which pass through the cylinder head to the engine coolant minimizes the requirements of the cooling system.

Further, since by decreasing the cooling demands, there is available more useful power from the engine, the same brake horse power can be maintained at a lower fuel consumption. This in turn allows downsizing the fuel injectors which also decreases the temperatures of the exhaust gases generated in the combustion chamber, and this, in turn, completes the synergistic effect.

Figure 2:
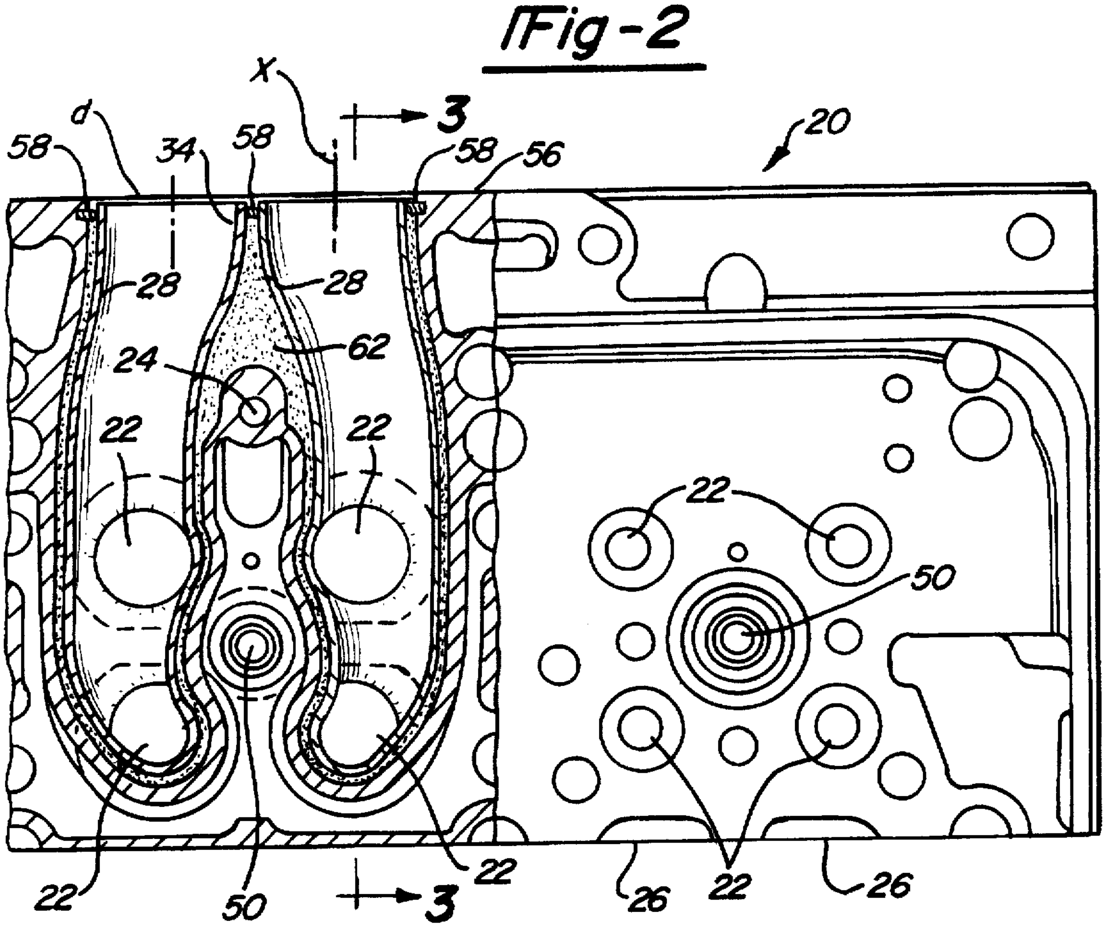
FIG. 2 is a plan view shown partially in cross-section of a portion of a cylinder head in accordance with the present invention.
Figure 3:
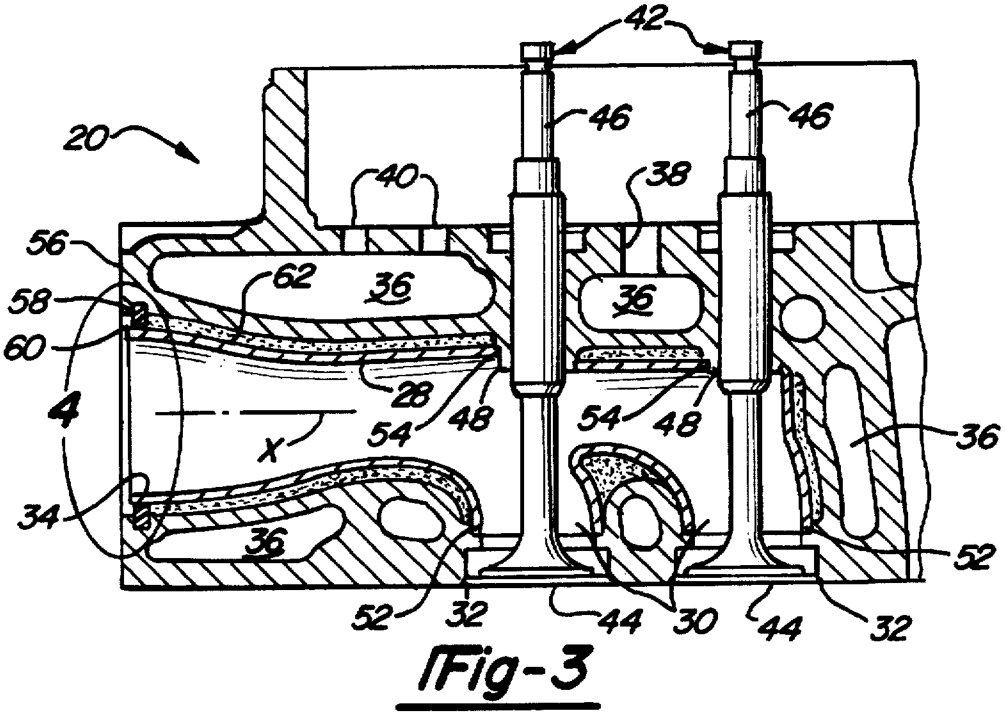
FIG. 3 is a side elevation view shown in section and taken along the lines 3—3 of FIG. 2.

In FIGS. 2 and 3, it will be noted that the cylinder head, generally designated 20, includes four exhaust ports 22, a port 24 for a glow plug and water outlet ports 26. Each one of a pair of heat shields 28 is cast in place within the cylinder head and extends from one end 30, namely the inlet end nearest the exhaust valve seats 32, to an opposite end 34 forming the outlet adjacent entrance to the exhaust manifold 12 (shown in FIG. 1).

The cooling water outlets 26 to the cylinder head are connected with a series of water cooling passages 36 throughout the cylinder head. The cylinder head is drilled and tapped at an appropriate place, designated 38, to receive a water temperature probe, and at other appropriate places, designated 40, to provide a means for supporting an exhaust valve actuating assembly (not shown) on the cylinder head. Exhaust valves 42 are to be disposed within the cylinder head. The valve heads 44 are seated at the combustion face of the cylinder head. The exhaust valve stems 46 of each valve extend vertically through the cylinder head 20 and respective exhaust heat shields 28 and are supported within the bore of a respective one of the valve guide bosses 48.

It will be noted that a lower depending portion of each guide boss 48 extends through the exhaust port shield as cast.

Finally, as seen particularly in FIG. 2, a vertically depending stepped bore 50 is provided to support a fuel injector. It is located equidistantly from the exhaust ports 22.

The preferred cylinder head casting material specification includes the following chemistry and microstructure:

Chemistry (% by weight):

| | |
|---|---|
| Total Carbon | 3.40–3.60 |
| Manganese | .60–.90 |
| Silicon | 1.80–2.10 |
| Chromium | .21 MAX. |
| Nickel | .05–.10 |
| Copper | .30–.50 |
| Phos | .05 MAX. |
| Sulfur | .15 MAX. |
| Molybdenum | .25–.40 |

Microstructure:

Fully pearlitic matrix with refined eutectic cell size.

Graphite to be 90% minimum type A with a flake size of 5–7.

Brinell Hardness Range:

BHN 179–229

The exhaust heat shield 28 is made of a highly heat-resistant material relative to the cast iron cylinder head. AISI 347 stainless steel is the preferred material for the exhaust shield. Preferably, the shield is fabricated as a casting utilizing a vacuum assisted casting process allowing various materials to be cast with very thin walls and exceptional dimensional stability. The thickness of the exhaust shield is preferably in the order of about 0.178 centimeters (0.070 inches). The process by which the exhaust shield is fabricated is disclosed in U.S. Pat. No. 4,340,108, and as such forms no part of the present invention.

As explained in greater detail below, the exhaust shield 28 is cast in place as the cylinder head casting is being made and thus provides that the shield will be affixed to and supported by the cylinder head at the areas designated 52 which are at the one end of the exhaust shield nearest the combustion face of the cylinder head at the valve seats, and at the areas designated 54 where the valve stem support bosses 48 extend through the exhaust shield wall. Finally, the exhaust shield is supported at its opposite end 34, nearest side wall 56 to which the exhaust manifold 12 is affixed (as shown in FIG. 1). This latter support is provided by an annular solid steel seal ring 58 which is diffusion bonded to the casting at its outer peripheral edge and is fitted onto the exhaust shield with a tight sliding, interengaging fit at its inner diametral surface upon a machined, axially extending and concentric land 60. It will be noted that the end 34 of the exhaust shield 28 as supported by the seal ring terminates within the cylinder head a short distance d from the side wall 56. The sliding fit with the ring seal and recessing of the end of the exhaust shield within the cylinder head is provided to allow the exhaust shield to axially expand along the longitudinal axis X as the hot exhaust gases are cycled through the exhaust shield. The seal ring 58 also allows radial heat expansion of the exhaust shield, which is preferably made of 300 series stainless steel material having a yield strength about equal to that of the exhaust shield.

As fixed to the cylinder head, the exhaust shield is held in spaced relation thereto to provide a gap 62 around its entire circumference and throughout its length with the exception of the support points 52, 54 and 58.

Within the gap 62 there is provided a fill of hollow ceramic particles (HCPs). The term "HCP" where used hereafter means hollow ceramic particles. Due to the selection of the HCPs, in terms of size and size range, and the fact that they are hollow and ceramic, there is provided an extremely effective insulating barrier against rejecting heat to the surfaces of the cylinder head casting itself, the exhaust gas heat being transferred through the stainless steel exhaust shield. The HCP layer is part of a mold core which includes the exhaust shield, as explained below, such that when the cylinder head is cast, the HCPs are also cast in place and maintained in place by the barrier provided by the annular seal 58 and the diffusion bonding at the remaining exhaust shield support areas 52 and/or 54.

Preferred HCPs include many of the usual refractory materials of metal oxides, e.g., alumina, hafnia and zirconia as well as non-metal oxides, e.g., silica and calcium oxides. Exemplary specifications of each, in terms of chemistry and particle size are given in Table I below:

TABLE I

Hollow Ceramic Material Specifications

| No. | Chemistry: Metal/Non-Metal Oxide - % by wt. Composition | Particle Size (Microns/ inch × $10^{-3}$) | |
|---|---|---|---|
| 1 | $SiO_2$-66%, $Al_2O_3$-33% | 10–350 m | (0.4–14) |
| 2 | $SiO_2$-66%, $Al_2O_3$-33% | 200–450 m | (8–18) |
| 3 | $SiO_2$-66%, $Al_2O_3$-33% | 10–150 m | (0.4–6) |
| 4 | $SiO_2$-66%, $Al_2O_3$-33% | 150–300 m | (6–12) |
| 5 | $SiO_2$-66%, $Al_2O_3$-33% | 18–110 m | (0.7–4) |
| 6 | $SiO_2$-66%, $Al_2O_3$-33% | 15–105 m | (0.6–4) |
| 7 | $Al_2O_3$-99%, | 24/60 grit | (41/16) |
| 8 | $ZrO_2$+$HfO_2$-95%, CaO-4% | 24/60 grit | (41/16) |
| 9 | $ZrO_2$+$HfO_2$-99% | 24/60 grit | (41/16) |
| 10 | $ZrO_2$+$HfO_2$-84%, $Al_2O_3$-10% | 24/60 grit | (41/16) |
| 11 | $SiO_2$-50%, $Al_2O_3$-50% | 1500 m | (60) |
| 12 | $SiO_2$-50%, $Al_2O_3$-50% | 1500 m | (60) |
| 13 | $SiO_2$-50%, $Al_2O_3$-50% | 2500 m | (100) |
| 14 | $Al_2O_3$-99% | 1500 m | (60) |
| 15 | $Al_2O_3$-99% | 1500 m | (60) |
| 16 | $Al_2O_3$-99% | 2500 m | (100) |

Preferred materials are those listed as Examples 1 and 2 in the Table which are sold by Zeeland Industries of the U.S.A. under the brand designations G-3800 and G-3500, respectively, with the former being the material most preferred.

The above-described HCP materials are held together as a layered mix on the exhaust shield by an organic resin binder which preferably will range from about 1% to about 3.5% by weight of the uncured HCP/resin mix. Greater resin content may produce an undesirable amount of gas during the casting of the cylinder head. Lesser resin content may yield an undesirable low core strength.

Any one of a number of other organic binders, which will be known to the person skilled in the art may also be used. The principle criteria for the binder being that it is to be held to a minimum to not only provide low gas evolution during the casting of the cylinder head but also assure that the HCPs themselves are in contact with one another throughout the cross-section of the HCP layer 62. This contact of minimal size HCPs has been found by the inventors to promote significant resistance to heat conductivity from the exhaust shield through the insulating layer 62. On the other hand, the resin content should not be so low as to provide unsatisfactorily low core strength.

A preferred mixture of HCP material and resin binder is 97.56% HCP and 2.54% organic resin wherein the HCP material is selected from Examples 1 and 2 of Table I.

Figure 5:
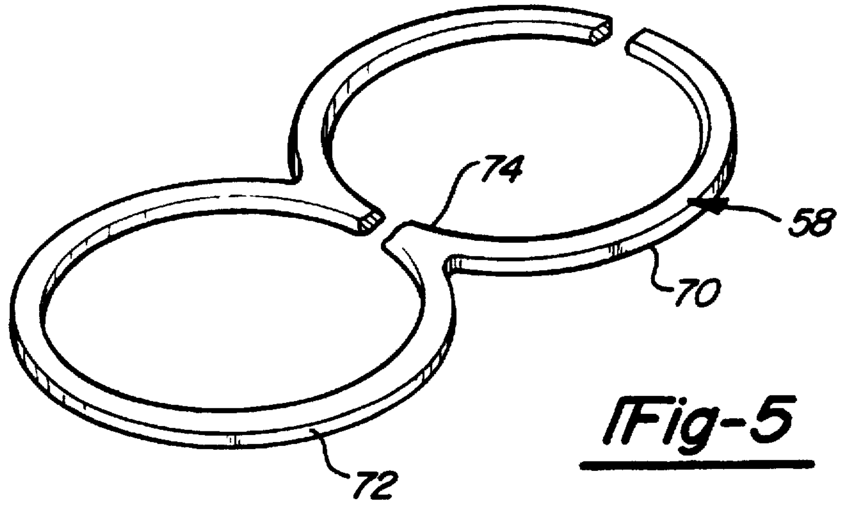
FIG. 5 is a perspective view, in partial cross-section, of the seal shown in FIGS. 2–4.

As noted above, an important feature of the present invention is the manner in which the exhaust shield is held in place by the annular seal 58. In FIGS. 4 and 5 there is shown a preferred annular seal member which is fabricated as a unitary structure, generally designated 58, and is seen to be formed in the figure eight configuration having separate rim portions 70 and 72 covering respective exhaust port shields of the left hand and right hand side exhaust shield configuration, shown best in FIG. 2. The rim portions 70,72 are joined at a common interface 74. The ring 58 is solid in cross-section and includes a substantial portion of its radial width being held within the cylinder head casting and diffusion bonded to it. The inner circumferential surface 76 of the seal is seen in FIG. 4 in cross-section to the radially inwardly convex so that it establishes with the machined surface or land 60 of the exhaust shield a line contact.

The aforementioned construction of the preferred annular seal is in sharp contrast to that previously known as part of the prior art, namely as shown in FIG. 6. The seal of FIG. 6 is seen to be a separate flange-type seal not forming a part of the casting but adapted to be slip-fitted on the land 60 of the exhaust shield after casting and finishing of the cylinder head. This is done as a final assembly step. The flange shield 78 thereby being adapted to held in place by a suitable gasket 80 arranged between the exhaust manifold and the side wall 56 of the cylinder head or by any other suitable means. As with the annular seal of the present invention as shown in FIGS. 4 and 5, the flange seal 78 does allow both axial and radial expansion of the exhaust shield.

Alternative embodiments of the annular seal member 58 are shown in FIGS. 7, 9 and 10, all of which are metal, and preferably stainless steel. In FIG. 7, a flange-type seal 82 having a radial flange 84 and a seal lip 86 is cast in place. The seal lip engages the land 60 of the exhaust shield and is directed axially outward toward the side wall 56. Alternatively, it could be directed inward. In FIG. 9, the ring seal is in the form of a solid O-ring 88 with the outer diametral portion of the O-ring being embedded in place in the cylinder head and the inner diametral portion of the O-ring providing a line contact with the land 60 of the exhaust shield. In FIG. 10, an O-ring type seal 92 includes a hollow interior to provide greater radial resilience than the embodiment of FIG. 9.

In FIG. 8 it is seen that an annular seal 90 may also be cast integral with the cylinder head casting. Stated otherwise, the annular seal is eliminated as a separate member. A sliding fit with the land 60 of the exhaust shield is maintained by preparing the land 60 with a thin heat shielding barrier wash prior to its being placed into the cylinder head sand mold as a core. It will be noted that this is a significant departure from the process of preparing the exhaust shield/HCP composite core as described below and illustrated in FIGS. 11 and 12.

Figure 11:
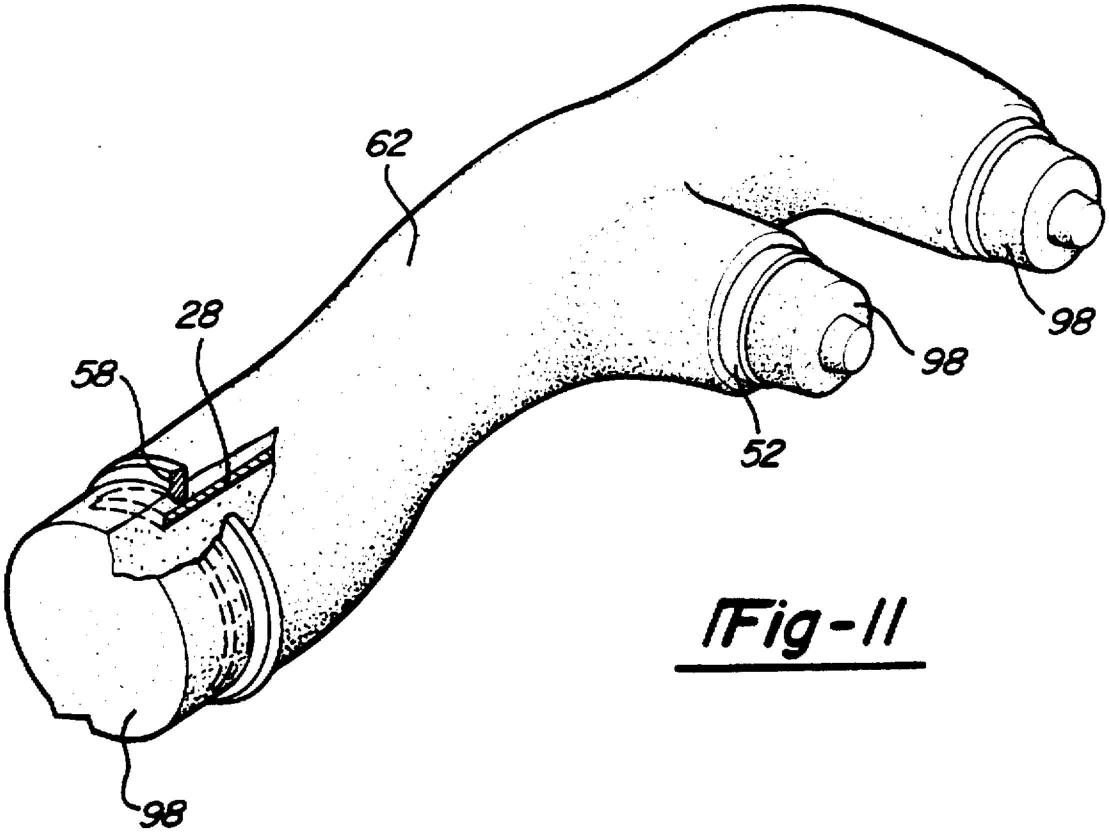
FIG. 11 is a perspective view of a molding core including the exhaust heat shield in accordance with the present invention.
Figure 12:
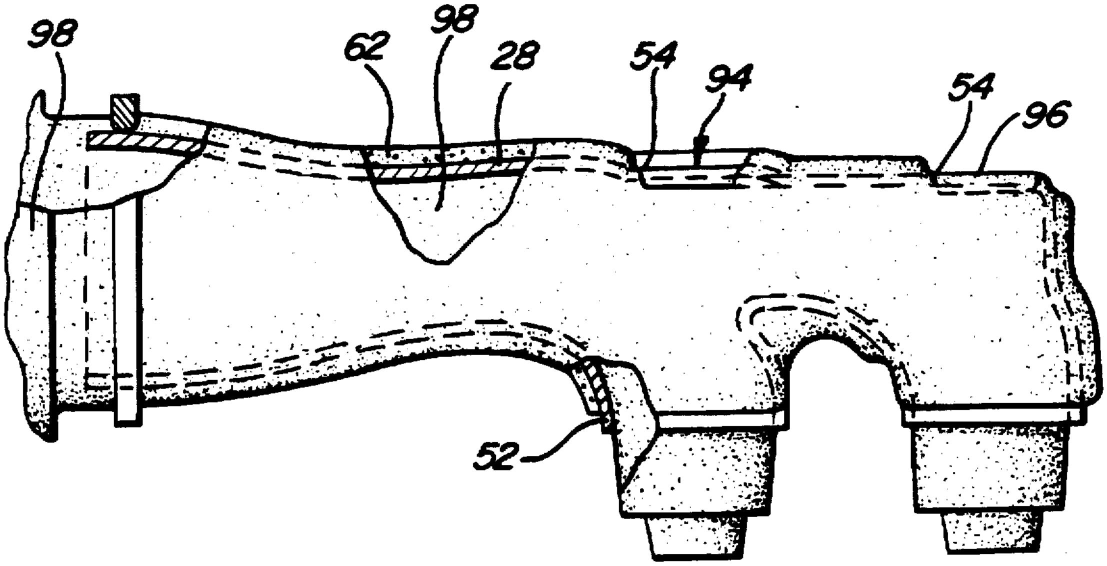
FIG. 12 is a side elevation view of the mold core shown in FIG. 11.

To prepare the exhaust shield/insulating composite core, as shown in FIGS. 11 and 12, the exhaust shield casting is finished machined at one end to provide the land 60, and machined also in the area of cylinder head exhaust port inlets at 52 to provide a clean surface to which the cylinder head casting may be diffusion bonded. Likewise, the exhaust shield exhaust valve boss areas 94 and 96 are drilled to provide a clean surface 54 in the wall of the exhaust shield through which the valve stem bosses 48 of the cylinder head may be diffusion bonded. Thereafter, the annular seal member 58 is pressed onto the land 60. The exhaust shield is then placed in a suitable mold, and the HCP insulating layer is cast about the outer circumference and length of the exhaust shield and a core sand 98 fills all of the interior of the exhaust shield and the axially outward portion of the land 60 on one side of the annular seal 58. The top portion of the annular seal is left exposed, or in other words, protected from any HCP or core sand application, as are the areas at the exhaust port inlet ends 52 of the shield to thereby allow diffusion bonding of the cylinder head casting to the exhaust shield and annular seal at the time the cylinder head is being cast.

Other constructions for casting the heat shield in place are also acceptable. For example, diffusion bonding can be limited to any one of the inlet end, outlet end or valve guide bosses with the remaining cylinder head casting to heat shield interfaces being provided as a close slip fit as described in regard to FIG. 8.

The exhaust port core containing the shields may be prepared as an individual composite mold core as shown in FIGS. 11 and 12. Alternatively, certain cylinder head configurations, as shown in FIGS. 2 and 3, for example, permit that the pair of exhaust shields may be prepared as a unitary composite mold core thereby further facilitating manufacturing efficiency and beneficially increasing the volume of HCP material in the area of the glow plug boss.

After curing the composite core, it is then ready to be placed in the sand mold utilized for casting the cylinder head. Following casting of the cylinder head, the core sand 98 will be shaken out of the cylinder head casting to define the water passages and for removal of sand from the interior of the exhaust shield as well as other places in the casting.

Figure 14:
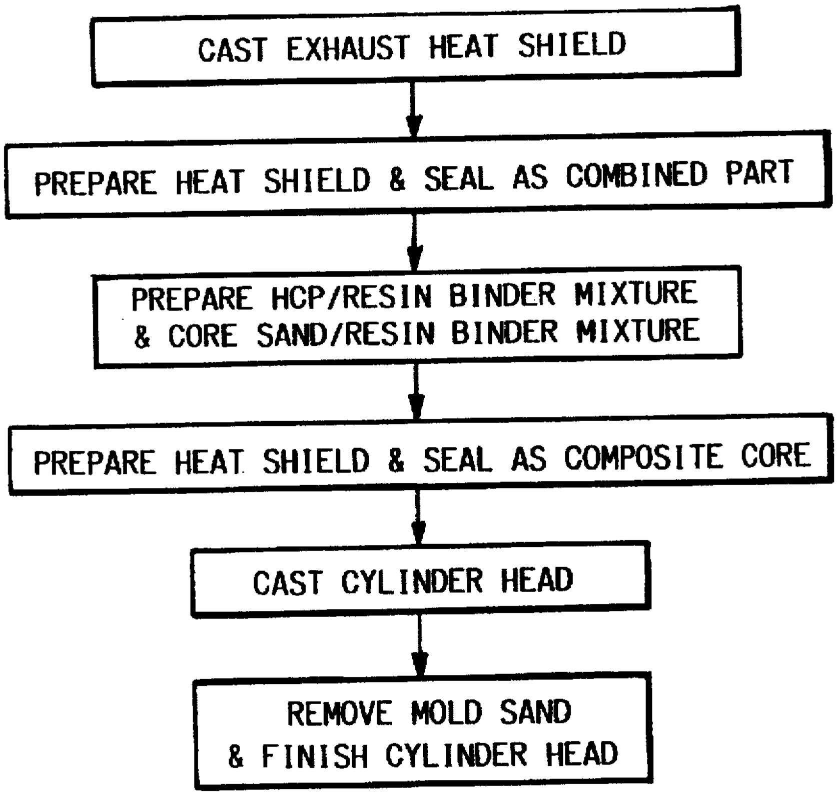
FIG. 14 is a schematic representation of the process of casting the cylinder head in accordance with the present invention.

This completes the cylinder head casting which is thereafter followed by machining and related operations not forming a part of this invention. The entire process as described above is shown diagrammatically in FIG. 14.

Figure 13:
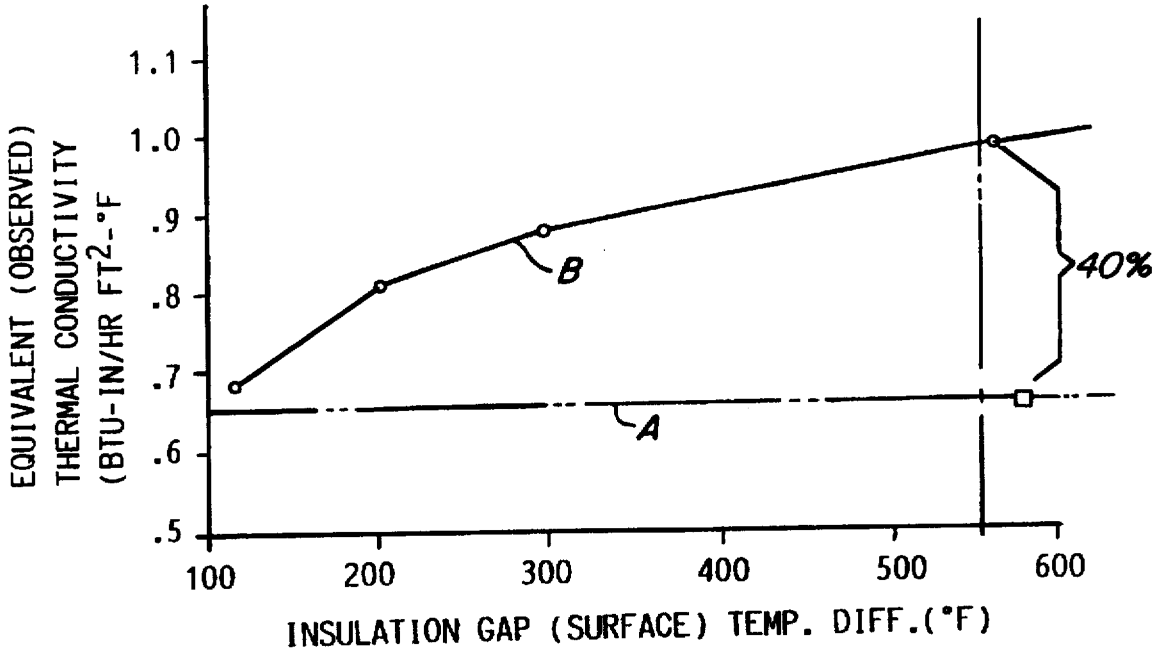
FIG. 13 is a performance curve showing the comparative thermal conductivity of the HCP material used in the cylinder head in accordance with the present invention ("A") as compared with the prior art air gap design ("B")

The functional and manufacturing efficiency of the cylinder head, as described above, is exceptional to anything heretofore known in the art, including that of just merely providing an air gap between the exhaust shield and the cylinder head. The comparative performance for the insulation media for air versus HCPs is shown in FIG. 13 wherein it will be noted that the thermal conductivity of the HCP material used in the cylinder head in accordance with the present invention, represented as A, remains relatively constant throughout any temperature differential (usually extending from approximately 100° F. to 600° F.) between the hot side of the heat shield and the surface of the head casting adjacent the heat shield, i.e., defining the HCP cavity. In contrast, the cylinder head utilizing an air gap between the exhaust shield and cylinder head, represented as B, rises significantly in thermal conductivity throughout this temperature differential range. In the final analysis, a decrease in thermal conductivity ranging in the order of 40% lower than the cylinder head air gap construction is attainable, as shown at C, which represent the designed temperature differential for a mean cylinder head/engine field operating condition.

While the best mode for carrying out the invention has been described in detail, those familiar with the art to which this invention relates will recognize various alternative designs and embodiments for practicing the invention as defined by the following claims.

What is claimed is:

1. A process for casting metal articles wherein a sand mold including a core is used to define at least a portion of the shape of the article being cast including a passageway therein, the improvement comprising fabricating at least a portion of the core defining the passageway using a layer of hollow ceramic particles;

depositing said layer of hollow ceramic particles on a surface of the sand mold exposed to the metal being cast;

said layer consisting only of hollow ceramic particles and a resin binder material holding said hollow ceramic particles in surface contact with one another; and retaining hollow ceramic particles and binder from the layer as a component of the article being cast.

2. A core to be used in molds for the casting of articles primarily comprising metals, at least a portion of said core comprising a mixture of generally spherical hollow ceramic particles uniformly distributed throughout a resin binder material;

said hollow ceramic particles ranging in diameter from about 200 microns to about 450 microns and individually being in surface contact with adjacent individual hollow ceramic particles throughout the mixture;

said hollow ceramic particles comprising about 99.0 to about 96.5% by weight of the mixture and the resin binder comprising about 1.0 to 3.5% by weight, respectively, of the mixture prior to the mixture being subjected to a metal casting process;

wherein hollow ceramic particles and resin binder from the mixture are retained as a component of the cast article;

thereby enhancing core strength and providing resistance to heat conductivity through the portion of the core occupied by the hollow ceramic particles.

3. The core of claim 2 wherein said hollow ceramic particles have a mean diameter of about 325 microns.

4. The core of claim 2 wherein said hollow ceramic particles have a composition comprising at least 50% by weight silica and less than 50% by weight aluminum oxide.

5. The core of claim 4 wherein said hollow ceramic particles are each of the same composition and comprise about 66 percent by weight silica and about 33 percent by weight aluminum oxide with the remainder being trace materials constituting no more than about 1% by weight of the particles.

6. The core of claim 2 wherein the resin binder is an organic material.

7. The core of claim 6 wherein the hollow ceramic particles comprise about 97.5% and binder about 2.5%.

8. The core of claim 2, said core comprising a composite of core components including a constituent layer consisting only of said mixture of hollow ceramic particles and resin binder.

* * * * *